United States Patent
Quintus

(10) Patent No.: US 6,231,465 B1
(45) Date of Patent: May 15, 2001

(54) BELT TENSIONER ASSEMBLY WITH UNIDIRECTIONAL DAMPING

(75) Inventor: James G. Quintus, Springfield, MO (US)

(73) Assignee: Dayco Products, Inc., Dayton, OH (US)

( * ) Notice: Subject to any disclaimer, the term of this patent is extended or adjusted under 35 U.S.C. 154(b) by 0 days.

(21) Appl. No.: 09/374,030

(22) Filed: Aug. 13, 1999

(51) Int. Cl.[7] ........................................................ F16H 7/12
(52) U.S. Cl. ............................ 474/133; 474/101; 474/135
(58) Field of Search .................................... 474/112, 101, 474/133, 135, 138, 115, 118, 140

(56) References Cited

U.S. PATENT DOCUMENTS

| | | |
|---|---|---|
| 3,924,483 | 12/1975 | Walker et al. |
| 4,473,362 | 9/1984 | Thomey et al. ........... 474/135 |
| 4,696,663 | 9/1987 | Thomey et al. ........... 474/133 |
| 4,981,461 * | 1/1991 | Henderson ................ 474/135 |
| 5,015,217 * | 5/1991 | Henderson ................ 474/135 |
| 5,030,172 * | 7/1991 | Green et al. .............. 474/135 |
| 5,334,109 * | 8/1994 | Izutsu et al. .............. 474/135 |
| 5,803,850 * | 9/1998 | Hong et al. ............... 474/135 |
| 5,993,343 * | 11/1999 | Rocca et al. ........... 474/133 X |

* cited by examiner

*Primary Examiner*—Thomas R. Hannon
*Assistant Examiner*—Marcus Charles
(74) *Attorney, Agent, or Firm*—Joseph V. Tassone

(57) ABSTRACT

A belt tensioner includes a stationary housing extending along a pivot shaft an lever arm mounted coaxially with the housing on the pivot shaft and formed with a free end which receives a pulley assembly juxtaposed with a belt to be tensioned. The arm is formed with a compartment receiving a damping assembly which slows down displacement of the lever arm and the pulley assembly upon pivoting the lever arm away from the belt.

20 Claims, 4 Drawing Sheets

BELT TENSIONER ASSEMBLY WITH UNIDIRECTIONAL DAMPING

FIELD OF THE INVENTION

The present invention relates to belt driven systems and, in particular to mechanical spring-actuated belt tensioning devices for use with the endless drive belts of the drive systems for vehicle accessories. Specifically, the present invention relates to a relatively simple and compact damping device supplying differing amounts of damping to a tensioner lever arm in accordance with directional displacement of the lever arm.

BACKGROUND OF THE INVENTION

According to the modern trend in the automobile industry, the various vehicle accessories, such as power steering pump, oil and air pumps, air conditioning and alternator, are operated by a single endless belt driven by a pulley connected to the engine crankshaft. Such system is referred to as a "serpentine" drive belt system. To provide optimum operating efficiency for the above-mentioned and other various accessories, it is imperative that a predetermined tensioning force of the drive belt be maintained to assure efficient performance of the accessories as well as satisfactory service life for the belt. As a result of the relatively greater length of the single drive belt which replaces the heretofore plurality of smaller belts, the belt tends to stretch. Such stretching affects the operating characteristics of the driven accessories. Therefore, it is desirable that a belt tensioning device to be used for these endless belts to provide reliable service over an extended period of time and to maintain a constant amount of tension thereon regardless of the amount of belt stretch. Hence, it is conventional practice in the belt tensioner art to provide for the application of a constant belt tensioning force which compensates for increases in belt length due to wear and vibration.

Countless attempts have been made to accomplish this purpose. A common type of conventional belt tensioner embodies a stationary housing and an angularly displaceable lever arm that carries a belt engaging pulley. A coil spring is braced against the stationary housing and displaceable lever arm and biases the latter toward the belt with a tensioning force varying in accordance with the vibrational nature of the belt. Despite this varying spring force a substantially constant force acting upon the lever arm is maintained.

For example, a belt tensioning device has been proposed in U.S. Pat. No. 3,924,483. This patent discloses a torsional spring for pivotally moving one of the vehicle accessories to achieve the desired tensioning force. Other tensioners of the above-described type utilize a pair of torsional springs for pivotally moving a lever and an idler pulley into belt tensioning engagement which results in an economic and compact unit. Specifically, in this type of tensioner, each spring is mounted on a respective side of the lever and engaged with the lever and housing for biasing the intervening lever toward the belt in a belt tensioning direction. Furthermore, the automobile industry has recognized the vibrational environment of an automobile belt system and its effect on spring oscillation.

It is desirable that a belt tensioner be provided with a damping means to prevent excessive oscillation from occurring in the spring member. Such means is designed to absorb sudden shocks and to prevent a whipping action from occurring in the tensioner and drive belt. This damping means is especially critical when a coil spring is used for applying the belt tensioning force since it is inherent to coil springs to develop natural oscillation frequencies upon applying of the fluctuating counter force by the belt. Such fluctuations diminish the efficiency of tensioning force of the spring. However, the damping requirements are essential in order to enable the belt system to function over an extended period on a pulsating machine without affecting a tensioning force that acts upon the drive belt.

U.S. Pat. No. 4,696,663 discloses a belt tensioner that includes a stationary housing 12, a lever arm 30, and a torsional spring 20 which is braced against the housing and the lever and biases the lever in a belt-tensioning direction. The belt tensioner is equipped with a brake 60 actuated by the spring into frictional engagement with a housing wall 13. Since the torsional spring provides both the tensioning force for the lever and the actuating brake force, the amount of damping is proportional to the belt tensioning force.

U.S. Pat. No. 4,473,362 discloses a separate damping body 108 whose damping characteristics are not constant but vary proportionately with the position of a pivot structure 40 relative to a stationary structure 36. A coil spring is mounted between the fixed and pivoted structures for resiliently biasing the latter in a direction away from the first limiting position thereof toward the second limiting position with a spring force, which increases as the pivot structure is displaced toward the belt. The damping body has a relatively tight fit at its inner periphery with the outer periphery of a core member 48 and a relatively loose fit between its exterior periphery and an interior periphery of the pivot structure. Angular displacement of the pivot structure between its first and second limiting positions is accompanied by a sliding movement between the exterior periphery of the damping body and the inner periphery of a mounting portion of the pivot structure. Since the radial pressure between these two contacting surfaces varies in accordance with the position of the pivot structure, the amount of friction likely vary as well and hence the torsional force required to overcome the frictional force may also vary. Thus, the arm advantageously experiences a greater damping effect in a belt-releasing direction.

A basic structure of a known prior art tensioner is shown in FIG. 1 and includes a stationary housing 3', a lever arm 4' operatively connected with the housing, and a spring 30' braced against the stationary housing and lever arm for generating the spring tensioning force. The stationary housing is mounted on an engine bracket adjacent to the belt system and, preferably, is formed of sheet metal or similar rigid material. Mounting of the housing is provided by a shaft 2'. The lever arm is pivotally mounted on the shaft and is formed with a radially outwardly extending raised arm, which terminates in a distant arm end. An idler pulley is operatively connected to the arm end for synchronous pivotal movement therewith toward and away from the belt system that is to be tensioned. A torsional spring is connected to the housing and the lever arm in a known manner and provides a tensioning force making the arm biased in a belt-tensioning direction. The lever arm is formed with a compartment 25' receiving a dampening device 11' which generates a uniform force tending to slow down the lever arm regardless of the direction in which the arm pivots.

It is desirable to have a structure that allows the lever arm to swing in a belt-tensioning direction relatively freely while, during rotation of the lever arm in a belt-releasing direction, to have a substantial force applied to the lever arm so as to provide high damping thereon.

SUMMARY OF THE INVENTION

It is therefore an object of the present invention to provide a tensioner that obviates the drawbacks of the prior art.

Another object of the present invention is to provide a tensioner with an external damping mechanism.

Still another object of the present invention is to provide a tensioner with a damping mechanism having a relatively simple structure.

Yet another object of the present invention is to provide a tensioner with a damping mechanism that generates different amount of damping in response to an angular displacement of a pivot structure of the tensioner toward and away from a belt system.

The above-articulated objects are obtained by the improved belt tensioner of the invention. A brake or damping device is mounted on a fixed shaft externally to a housing and faces the cavity that is formed in a lever arm. The device includes a pivotal friction element pressed against an inner surface of the lever arm with a varying force depending on the direction of displacement. The friction device is a combination of a friction shoe, which has a surface formed complementary to the inner annular surface of an outer peripheral wall of the lever, a hollow pivot pin rotatably mounted on a pin shaft, and a deflecting element. In order to actuate the brake system, the actuating device, according to the invention, exerts a force upon the friction shoe which, in turn, urges against the inner surface of the wall. Thus, this force is generated in response to displacement of the arm away from the belt system as a result of the belt fluctuations and, therefore, impedes the angular velocity of the arm.

Alternatively, when the arm upon application of the tensioning force moves toward the belt system, the actuating device acts upon the deflecting element in such a manner that the latter deflects the friction shoe off the inner surface of the arm wall. This mode of operation corresponds to the arm displaceable in the belt-tensioning direction.

The actuating device in the invention is an O-ring made of a plastic material. The O-ring engages respective guiding surfaces of the deflecting element and the pivot shaft that are shaped specifically to either advance or deflect the friction shoe with respect to the inner surface depending upon a direction of the lever.

The system is a simple and compact device and obviates many of the drawbacks of the known prior art. The description of the invention is given by way of example, and the scope of the invention is not limited to the exact details shown or described.

BRIEF DESCRIPTION OF THE DRAWINGS

The above and other objects, features and advantages will become more readily apparent from the following detailed description of the invention, references being made to the accompanying drawings, in which.

DETAILED DESCRIPTION OF THE INVENTION

Figure 1:
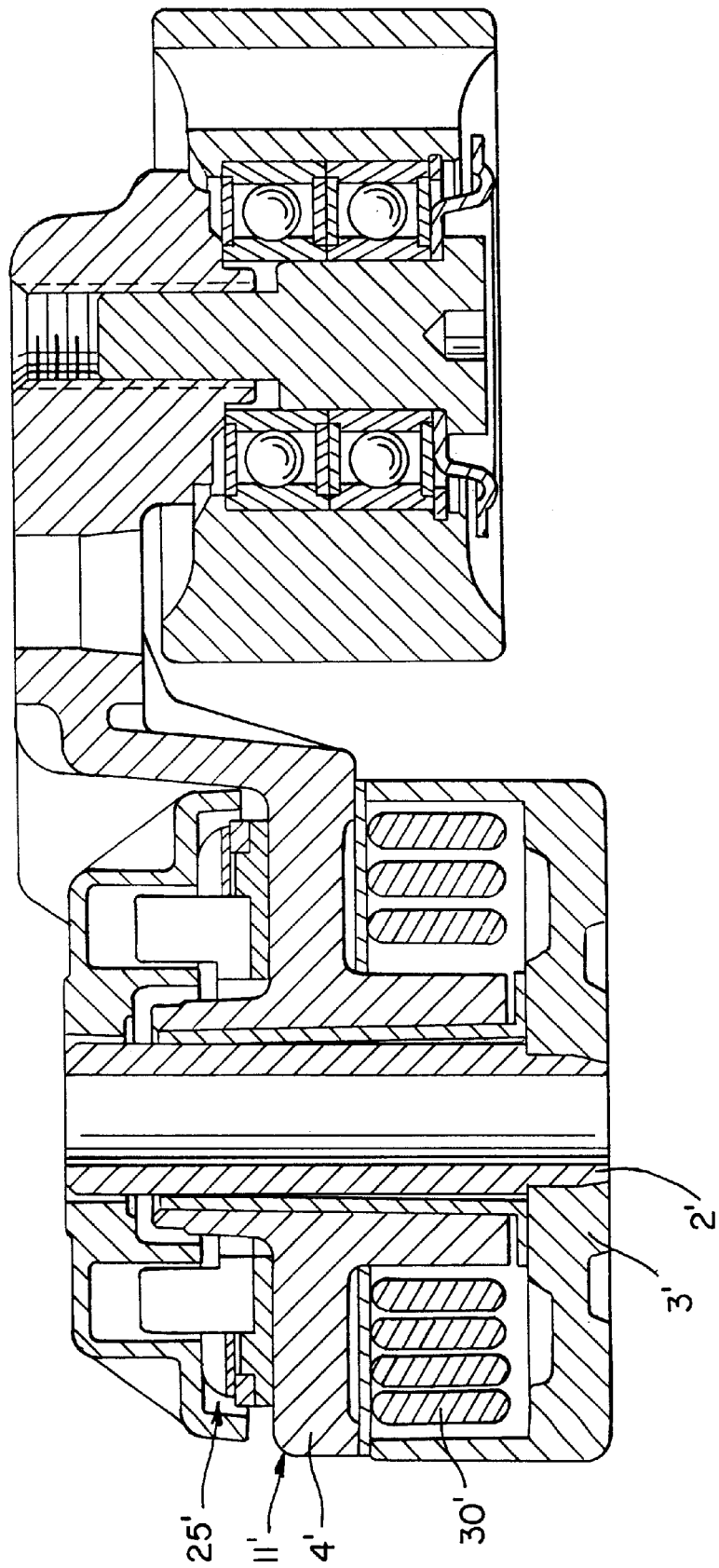
FIG. 1 is a belt tensioner disclosed by the known prior art.
Figure 2:
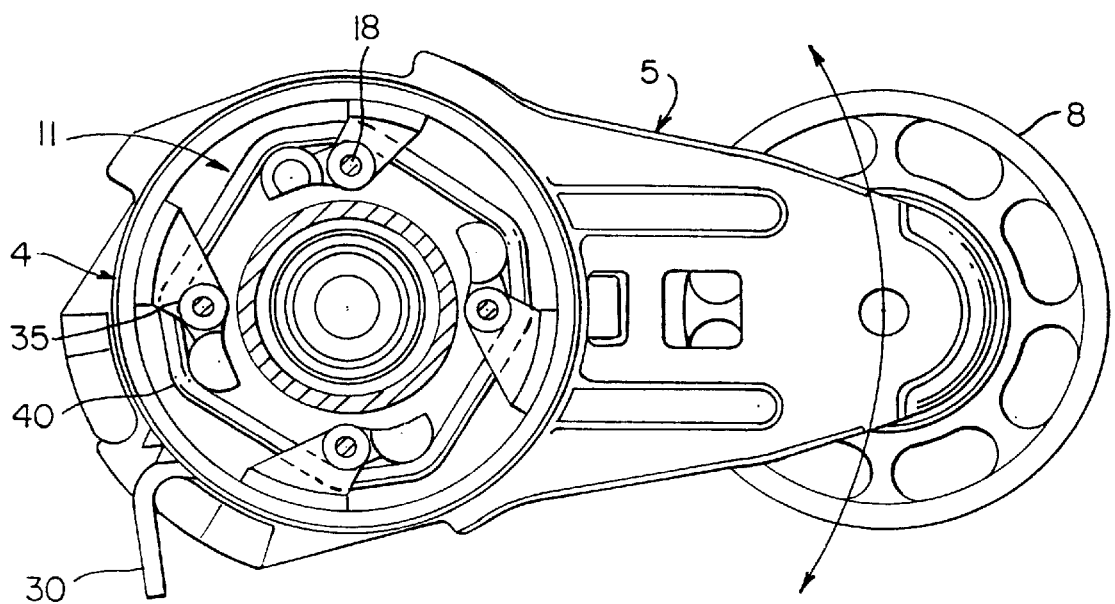
FIG. 2 is a top plan view of a belt tensioner according to the invention.

Referring to FIG. 2, a belt tensioner according to the invention includes a mounting assembly formed with a damping device 11, a raised arm 5 and an idler pulley assembly mounted rotatably on the raised arm.

Figure 3:
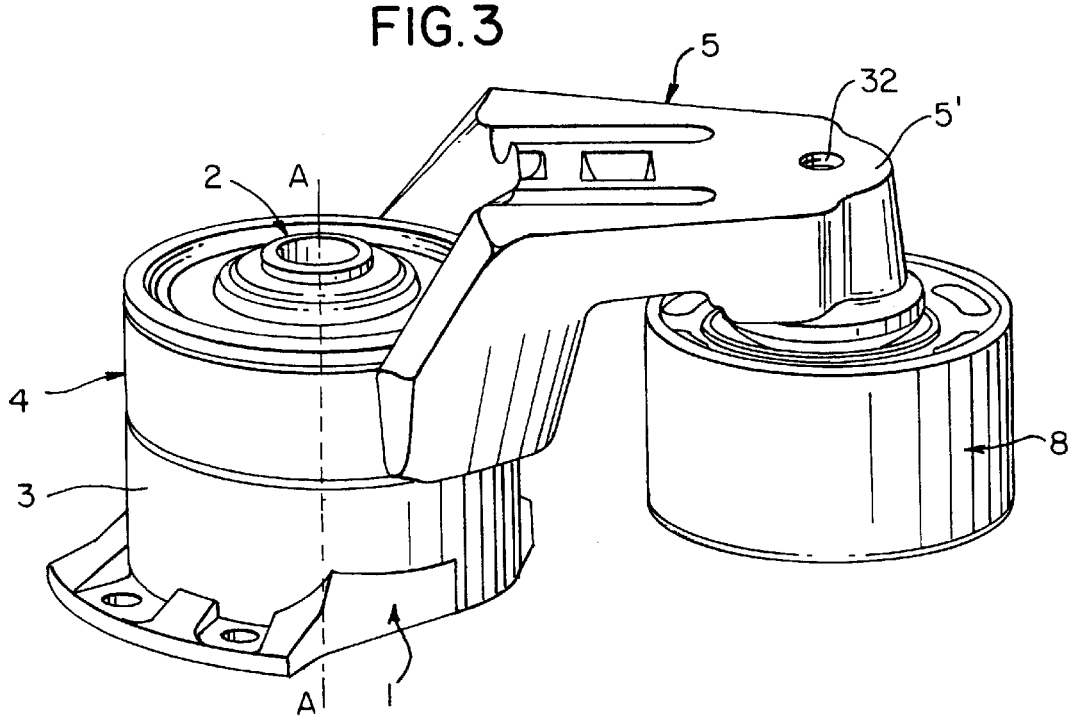
FIG. 3 is a side perspective view of the belt tensioner shown in FIG. 2.

As seen in FIG. 3, the mounting assembly of the belt tensioner according to the invention includes a bracket 1, which preferably is formed of an aluminum casting and is attached to a vehicle engine. The bracket is provided with a plurality of mounting holes, two of which are seen in FIG. 3. The bracket further includes an annular-shaped housing indicated at 3 and fixedly mounted to a pivot shaft 2.

Juxtaposed with the housing 3 is a lever arm 4, which is pivotally mounted on the shaft 2 and formed with the radially extending raised arm 5. A free end 5' of the raised arm 5 has a bore 32 receiving a shaft 7 (FIG. 5) centered along a respective axis parallel to the axis A—A. An idler pulley assembly including an idler roller 8 is rotatably mounted on the shaft 7 by means of a bearing assembly 33 (FIG. 5).

Figure 4:
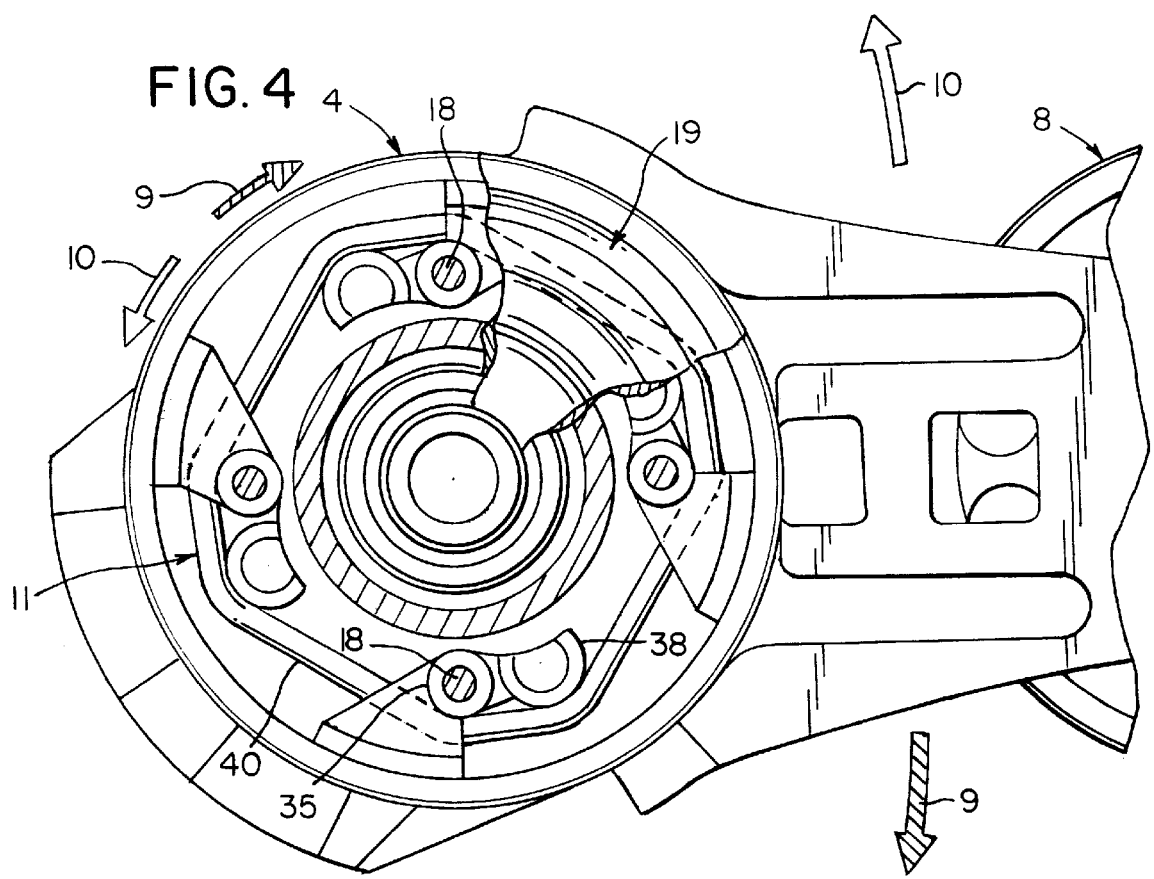
FIG. 4 is an enlarged view of the belt tensioner shown in FIG. 2.

FIG. 4 illustrates a partially broken away view of the assembly illustrated in FIG. 2. As will be explained below, the lever arm 4 is biased in a belt-tensioning direction indicated by an arrow 9, thereby bringing the roller 8 in contact with the belt (not shown herein). The assembly includes the damping device 11 designed to increase sliding friction between the components of the assembly upon moving the arm in a belt-releasing direction denoted by an arrow 10.

Figures 5, 6, 7:
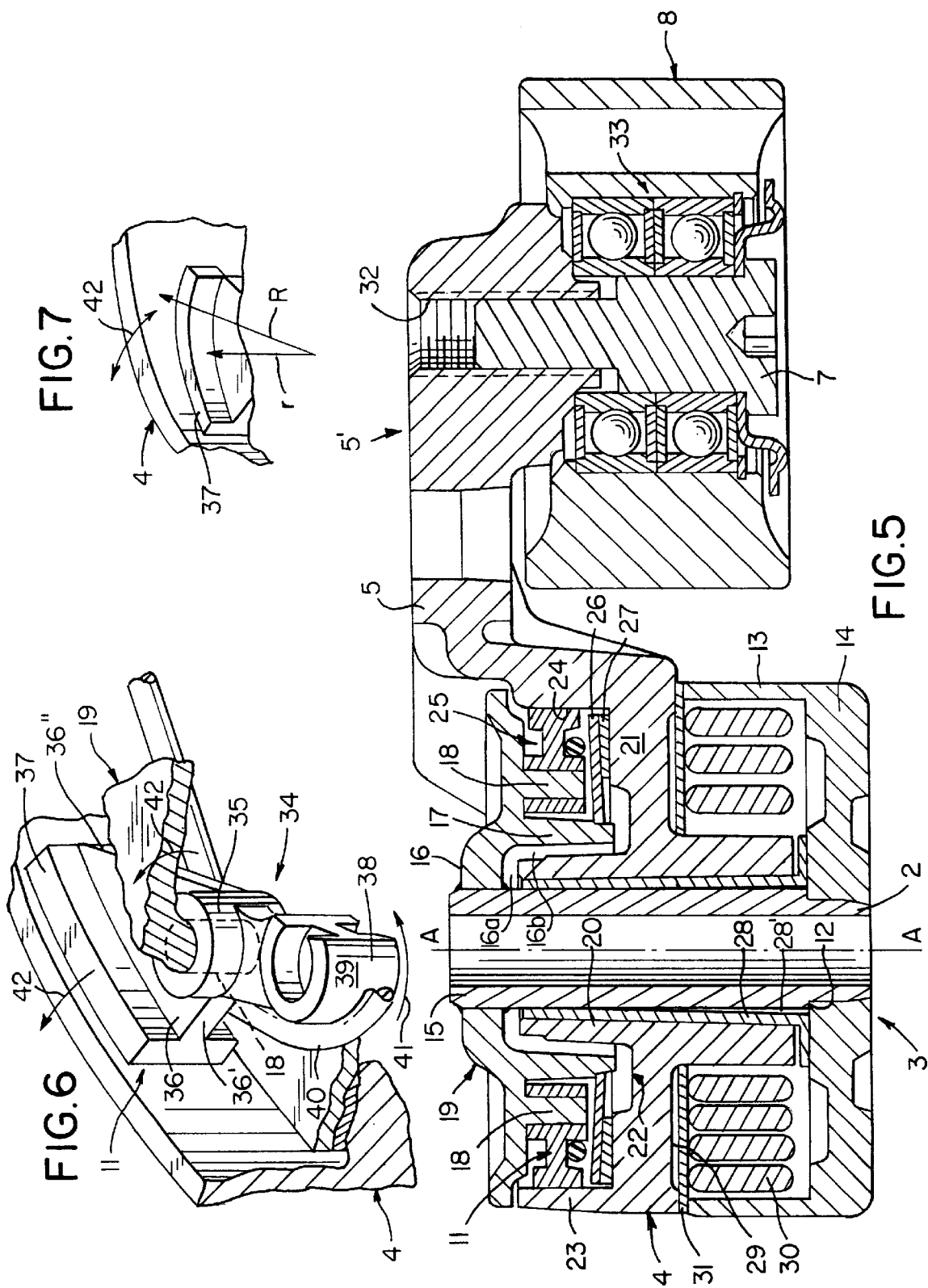
FIG. 5 is a cross-sectional view of the belt tensioner shown in FIG. 2.
FIG. 6 is a perspective view of a damping device of the belt tensioner shown in FIG. 2.
FIG. 7 is a diagrammatic view of another embodiment of a damping device of the belt tensioner shown in FIG. 2.

Referring now to FIG. 5, the shaft 2, shown in this figure as a sleeve, has its inner axial end keyed to the housing 3. Generally, the sleeve is formed with an annular seat 12 pressed against a respective annular shoulder of the housing 3. The housing 3 has a cup-shaped form and is provided with a cylindrical wall 13 extending axially outwardly from a bottom 14 which is formed on the bracket 1 (FIG. 3).

An outer axial end 15 of the shaft 2 receives an end cap 19 formed with a respective flange 16 which extends radially outwardly and is provided with an inner annular shoulder 17 and a plurality of angularly spaced apart outer shoulders 18. The shoulders are spaced inwardly from opposite ends of the flange 16 and have different axial dimensions. As shown in FIG. 5, the inner shoulder 17 is longer than each of the outer shoulders 18.

Mounted between the end cap 19 and the housing 3 is the arm 4 which has a cylindrical hub 20 formed with an inner axial surface spaced radially from and surrounding the shaft 2, so that the shaft and the hub form an axial channel 28' therebetween. The hub 20 terminates at a distance from the flange 16 and is spaced radially inwardly from but axially overlaps the inner shoulder 17, thereby forming radial 16a and axial 16b channels with the flange 16 and inner shoulder 17 respectively. The hub 20 is formed with an annular shoulder 21 extending radially outwardly from the hub and having a stepped outer surface 22. Spaced diametrically opposite from one another are a flange 23 and the raised arm 5. The flange 23 extends axially outwardly and terminates inwardly from the flange 16 of the end cap 19.

A combination of the flange 23, the inner shoulder 17 of the end cap and an axial surface 24 of the raised arm 5 defines a compartment 25. An inner axial end of the inner shoulder 17 and a respective end of the flange 23 of the lever arm are bridged by an armplate 26 providing the structure with necessary stiffness. To enhance a sliding contact between the lever arm and the housing, the armplate 26 is provided with a bushing 27 which is juxtaposed with the outer surface 22 of the shoulder 21. Due to radial riveting of the armplate, the latter has a tendency to bend axially inwardly, thereby positively affecting tightness of the whole assembly. In order to accommodate such axial displacement, the bushing 27 terminates radially outwardly from a respective inner edge of the armplate and is formed with a taper.

The inner axial surface of the hub 20 and the outer surface of the sleeve 15 form an axial channel therebetween which receives an annular bushing 28 having an inverted T-shaped cross-section. To compensate loads inserted upon the stationary structure as a result of pivotal displacement of the arm in response to belt oscillation, the bushing 28 may have an inner axial surface flaring slightly axially inwardly. As a result of such structure, misalignment of the pulley relative to the belt is substantially eliminated.

An inner surface 29 of the shoulder 21 forms a spring compartment, which is limited on opposite axial sides by the cylindrical wall 13 of the housing and the hub 20. The spring compartment receives a spring element 30 generating a torque upon the pivotal lever arm. To provide a sliding contact and a guide surface, a spring bushing 31 extends radially between the inner surface 29 of the lever arm and a respective surface of the wall 13 of the housing.

The compartment 25 receives the damping device 11, which is designed to slow rotational movement of the arm in the belt-releasing direction 10. As mentioned above, when the tension of the belt decreases due to its oscillation causing pivoting of the arm in the belt-releasing direction, it is highly advantageous to slow this movement in order to maintain substantially uniform forces acting upon the belt and generated by the arm. Based on a cyclical character of the belt movement, it may take microseconds to move the arm back in the belt-tensioning direction. Thus, the damping device, in addition to the spring element 30, provides braking of the arm during this short period of time.

The device 11, as illustrated in FIG. 6, includes a plurality of angularly spaced elements 34 mounted pivotally in the compartment 25 (FIG. 5). Each element 34 includes a hollow pivot pin 35 slidably receiving the respective outer shoulder 18 of the end cup 19. Extending radially outwardly is a relatively narrow shoulder 36 which is formed with a friction element 37 centered on an outer edge of the shoulder 36. The element 34 further includes a deflecting support 38 having a curved guiding surface 39 and an elastomeric element 40, for example an O-ring, engaging respective surfaces of the pivot pins and the supports 38. The shoulder 36 is generally triangular and has a shorter side 36' and a longer side 36" bridged by the friction element 37. A center plane of each pivot pin is aligned with the respective short side. The friction element 37 is formed with an outer radial surface having a contact with the inner surfaces of the arm. The pivot pin of the friction device is positioned so that when the arm turns in the belt-tensioning direction, the friction elements slide easily against the arm, but when the arm turns in the opposite direction, the friction elements exert substantial friction forces against the inner surface of the arm.

Particularly, during displacement of the arm in the belt-tensioning direction, the forces generated by the elastomeric element 40 act upon the supports 38 and the pins 35 such that the friction element 37 tends to have as little friction as possible with the surface of the arm. As a result, the arm is displaced toward the belt without additional retardation and in a short period of time.

When the raised arm rotates in the counterclockwise belt-releasing direction 10, the elastomeric spring element 40 generates the pushing force directed radially as shown by arrow 41. In response to this pushing force, the support 38 generates the pressing force transmitted to the pin 35 and directed to generate radially outwardly directed forces 42. As a consequence, the friction elements 37 press radially outwardly against the inner surface of the lever, thereby generating additional friction forces between respective surfaces and slowing down angular movement of the raised arm in the belt-releasing direction.

In the embodiment shown in FIG. 6, a contact surface of the friction elements 37 is formed generally complementary to the inner surface of the lever 4. However, the contact surface of element 37 can be formed with a radius "r" which is smaller than a radius "R" of the inner surface of the arm 4, as shown in FIG. 7. Therefore, when the arm is movable in the belt tensioning direction, the sliding friction is of no significance. However, in the belt releasing direction, the friction element wedges against the arm thereby increasing the contact area and providing higher damping.

Various modifications of the device of the invention may be made without departing from the scope thereof and it is to be understood that the invention is intended to be limited only as defined in the appended claims.

I claim:

1. A belt-tensioning device for tensioning an endless drive belt, said device comprising:
   a pivot shaft extending along a longitudinal axis;
   a lever arm mounted pivotally on said pivot shaft and formed with a distant end;
   a spring for pivoting said lever arm about said longitudinal axis toward an endless drive belt in a belt-tensioning direction;
   a pulley assembly mounted on said distant end of said lever arm for receiving said endless drive belt and applying a tensioning force thereon upon displacement of said lever arm in said belt-tensioning direction; and
   a damping assembly mounted on said lever arm and including:
      a plurality of angularly spaced apart pivot pins rotatable about respective pivot axes parallel to said longitudinal axis, and
      a plurality of friction elements each formed on a respective one of said pivot pins and extending toward and terminating next to said lever arm, said friction elements being displaceable away from said lever arm and urging thereagainst with a first frictional force as said lever arm rotates in said belt-tensioning direction, said friction elements being displaceable towards said lever arm so as to generate a second frictional force greater than said first frictional force as said lever arm is rotated in a belt-releasing direction opposite to said belt tensioning direction.

2. The belt-tensioning device defined in claim 1 wherein said lever arm has an inner surface defining a compartment in said lever arm which receives said damping assembly, said plurality of frictional elements extending radially outwardly and pressing against said inner surface.

3. The belt-tensioning device defined in claim 2 wherein said damping assembly further includes a plurality of guiding supports each spaced angularly apart from and rigidly connected to a respective pivot pin, and
   a resilient element peripherally engaging said pins and guide supports to enable said friction elements to be simultaneously displaced radially outwardly toward said inner surface of said lever arm upon pivoting said lever arm in said belt-releasing direction.

4. The belt-tensioning device defined in claim 3 wherein each of said friction elements is formed with a respective outer surface formed complimentary to said inner surface of said arm.

5. The belt-tensioning device defined in claim 3 wherein said resilient element includes an elastic O-ring, each of said pivot pins comprising a hollow shaft.

6. The belt-tensioning device defined in claim 2 wherein each of said friction elements and a respective one of said pivot pins are bridged by a respective substantially triangular web having a respective pair of side walls converging towards said pin.

7. The belt-tensioning device defined in claim 2, wherein said pivot shaft spaced radially apart from a housing of said pulley assembly and has an outer pivot end terminating axially outwardly from said lever arm, said device further comprising:
   an annular cover mounted rotatably fixed on said outer end of said pivot shaft and extending radially outwardly therefrom and covering said compartment,
   an inner annular shoulder extending axially inwardly from said cover into said compartment, and
   a plurality of angularly spaced apart outer shoulders spaced radially outwardly from and substantially parallel to said inner annular shoulder but being shorter than said inner shoulder, each of said outer shoulders receiving said pins of said damping assembly.

8. The belt-tensioning device defined in claim 3 wherein each of said friction elements is formed with a respective outer surface formed with a radius smaller than a radius of said inner peripheral surface of said lever arm.

9. The belt-tensioning device defined in claim 7 wherein said compartment is formed with an annular armplate extending between said inner shoulder and said inner surface of said lever arm, said belt-tensioning device further including an armplate bushing sandwiched between said armplate and a bottom of said compartment and terminating radially outwardly from an annular radial inner edge of said armplate.

10. The belt-tensioning device defined in claim 8 wherein said armplate bushing tapers radially inwardly.

11. The belt-tensioning device defined in claim 8 wherein said lever arm has an inner axially extending surface spaced radially from said pivot shaft so as to define an axial channel therebetween, said axial channel receiving a pivot bushing flaring axially inwardly, said pivot bushing being in continuous axial contact with said armplate but being spaced radially apart from an inner axial end of said pivot shaft.

12. The belt-tensioning device defined in claim 10 wherein said pivot bushing is formed with a radial flange extending radially outwardly in the vicinity of said inner axial end of said pivot shaft and juxtaposed with said armplate.

13. A belt-tensioning device for tensioning an endless drive belt, said device comprising:
   a pivot shaft extending along a longitudinal axis;
   a spring-loaded lever arm mounted pivotally on said pivot shaft and biased in a belt-tensioning direction to apply a tensioning force to an endless drive belt; and
   a plurality of friction elements pivotal about pivot axes parallel to said longitudinal axis, said friction elements being displaceable away from said lever arm to press against said lever arm with a first frictional force as said lever arm rotates in said belt-tensioning direction, said friction element being displaceable towards said lever arm to urge thereagainst with a second frictional force greater than said first frictional force to impede displacement of said lever arm during rotation thereof in a belt-releasing direction opposite to said belt-tensioning direction.

14. The belt-tensioning device defined in claim 13 wherein said lever arm has an inner surface defining a compartment therein which receives said friction elements extending radially outwardly from said pivot shaft towards said inner surface.

15. The belt-tensioning device defined in claim 14, further comprising a plurality of pivot pins rigidly connected to said friction elements to rotate therewith, guiding supports each spaced angularly apart from and rigidly connected to a respective pivot pin, and an elastomeric endless element peripherally engaging said pins and guide supports for simultaneously swinging said friction elements radially outwardly towards said inner surface of said lever arm during rotation of said lever arm in said belt-releasing direction.

16. The belt-tensioning device defined in claim 14 wherein each of said friction elements is formed with a respective outer surface formed complementary to said inner surface of said arm.

17. The belt-tensioning device defined in claim 15 wherein said elastomeric element includes an elastic O-ring, each of said pivot pins comprising a hollow shaft.

18. The belt-tensioning device defined in claim 15 wherein each of said friction elements and a respective one of said pivot pins are bridged by a pair of side walls, which converge towards said pin.

19. The belt-tensioning device defined in claim 14, further comprising:
   a pulley assembly mounted on a distant end of said lever arm for receiving said endless drive belt and applying a tensioning force thereon upon displacement of said lever arm in said belt-tensioning direction, wherein said pivot shaft is spaced radially apart from a housing of said pulley assembly and has an outer pivot end terminating axially outwardly from said lever arm;
   An annular cover mounted rotatably fixed on said outer end of said pivot shaft and extending radially outwardly therefrom and covering said compartment;
   an inner annular shoulder extending axially inwardly from said cover into said compartment; and
   a plurality of angularly spaced apart outer shoulders spaced radially outwardly from and substantially parallel to said inner annular shoulder but being shorter than said inner shoulder, each of said outer shoulders receiving said pins of said damping assembly.

20. A method of operating a belt tensioner for tensioning an endless drive belt, said belt tensioner comprising:
   a housing fixedly mounted on an engine; and
   a spring-loaded lever arm mounted rotatably to said housing and resiliently biased in a belt-tensioning direction to apply a tensioning force to an endless drive belt, said method comprising the steps of:
   providing said lever arm with an inner annular peripheral wall;
   providing a plurality of angularly spaced apart pins rigidly connected to said housing and spaced radially inwardly from said inner peripheral wall of said lever arm;
   providing a plurality of friction elements each mounted rotatably on a respective one of said pins and extending towards and urging against said inner peripheral wall of said lever arm;
   displacing said friction elements away from said inner peripheral wall of said lever arm during rotation thereof in said belt tensioning direction, thereby exerting a first frictional force upon said inner peripheral wall; and
   displacing said friction elements towards said inner peripheral wall to press thereagainst with a second frictional force greater than said first frictional force, thereby impeding displacement of said arm in a direction opposite said belt-tensioning direction.

* * * * *